April 12, 1932.  S. H. HALE  1,853,809
COMBINE HARVESTER
Filed May 29, 1930  4 Sheets-Sheet 1
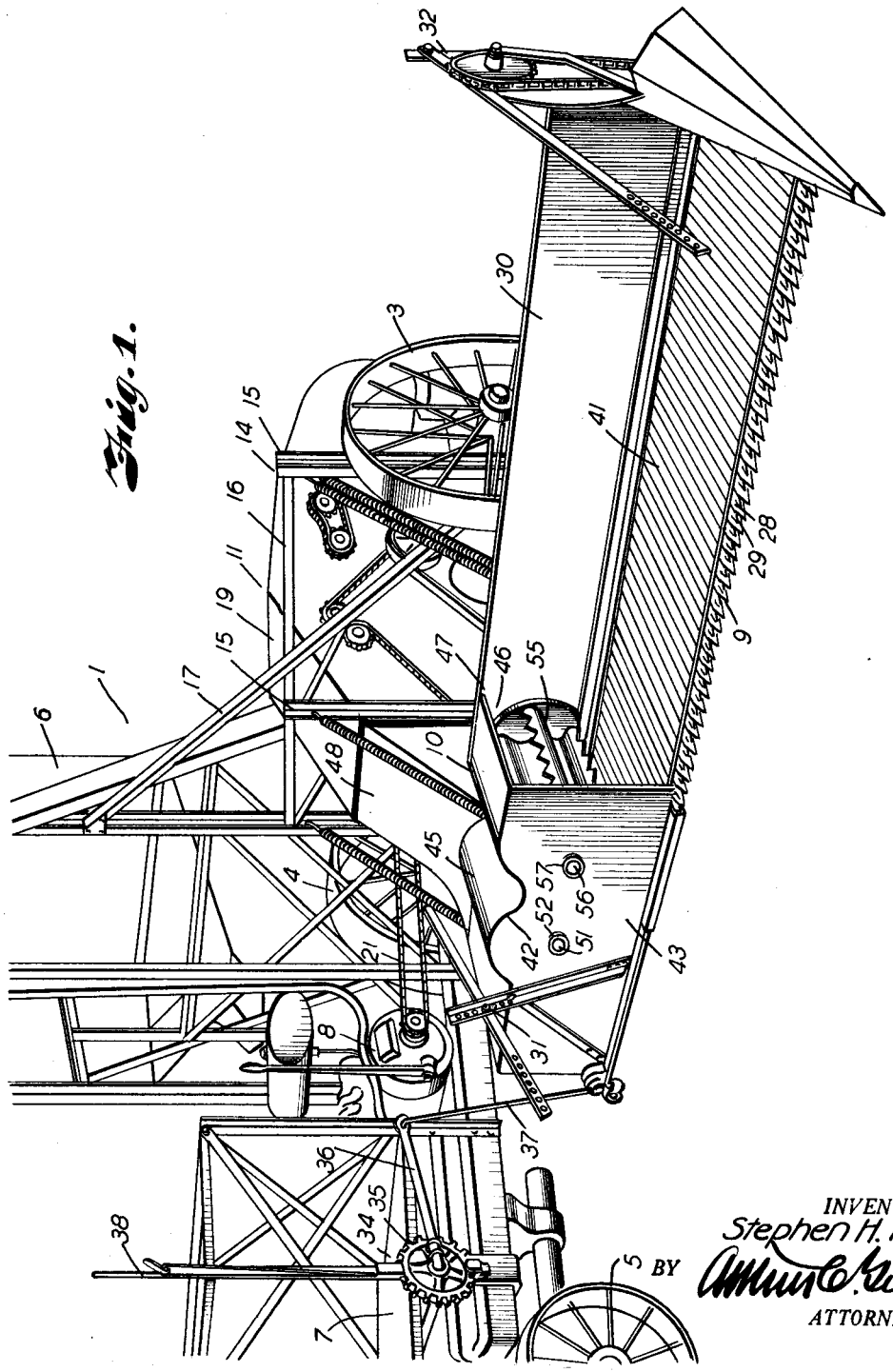
INVENTOR.
Stephen H. Hale
BY
ATTORNEY

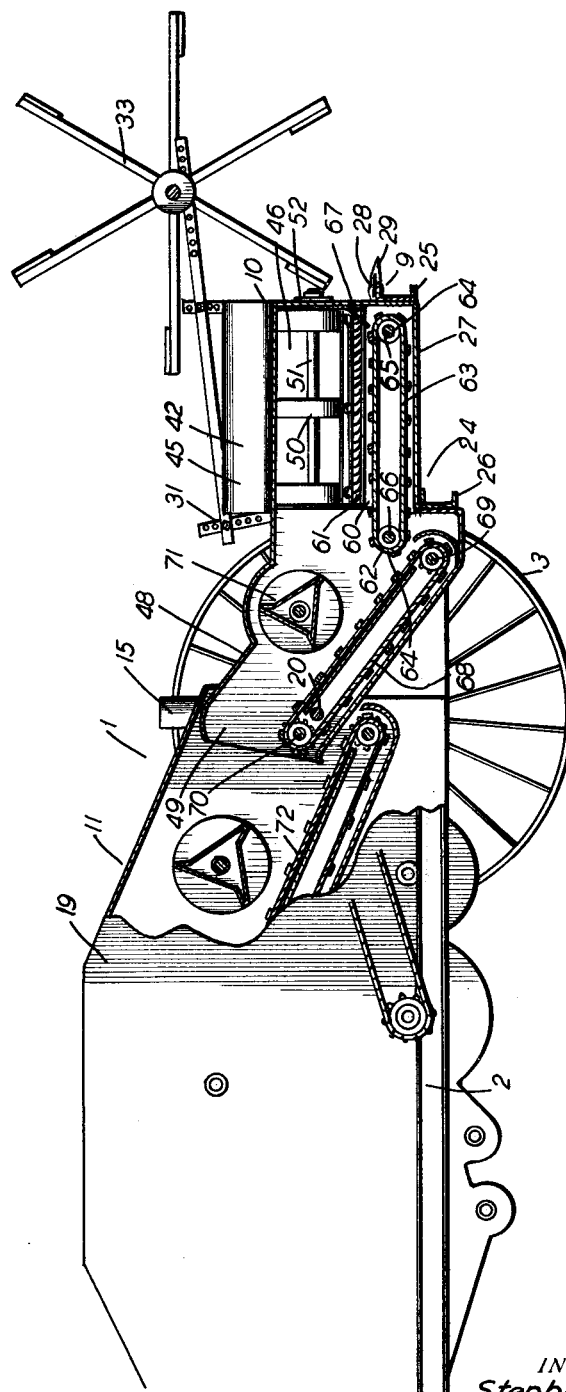

April 12, 1932.  S. H. HALE  1,853,809
COMBINE HARVESTER
Filed May 29, 1930   4 Sheets-Sheet 3
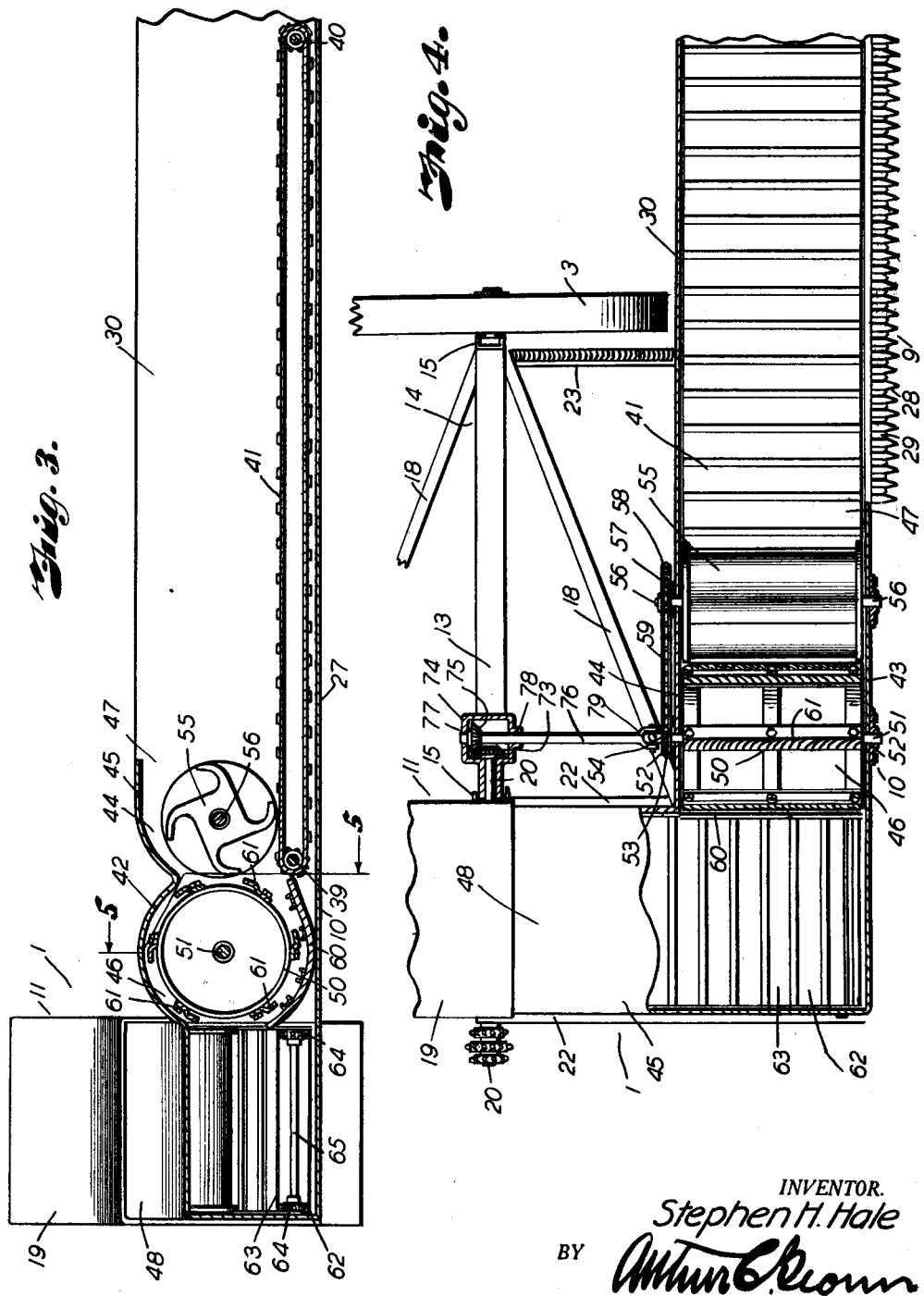
INVENTOR.
Stephen H. Hale
BY
ATTORNEY.

April 12, 1932.  S. H. HALE  1,853,809
COMBINE HARVESTER
Filed May 29, 1930   4 Sheets-Sheet 4
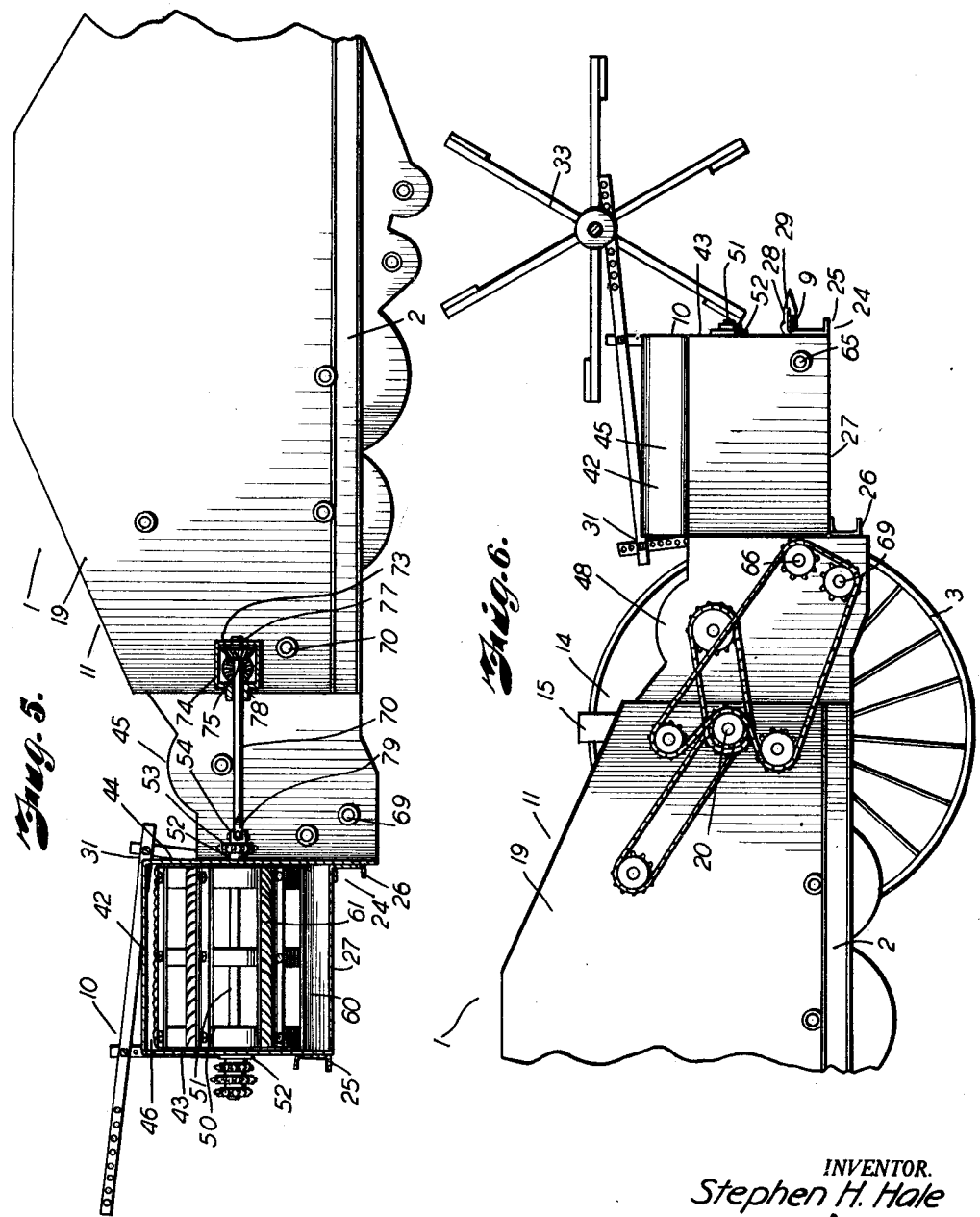
INVENTOR.
Stephen H. Hale
BY
ATTORNEY.

Patented Apr. 12, 1932

1,853,809

UNITED STATES PATENT OFFICE

STEPHEN H. HALE, OF KANSAS CITY, MISSOURI, ASSIGNOR TO GLEANER COMBINE HARVESTER CORPORATION, OF INDEPENDENCE, MISSOURI, A CORPORATION OF DELAWARE

COMBINE HARVESTER

Application filed May 29, 1930. Serial No. 456,929.

My invention relates to harvesting machines, and more particularly to a combine machine of that character for cutting, threshing and separating wheat or similar grain in successive stages as the machine is drawn through the field; the principal objects of the present invention being to provide a simple and compact construction and to increase the efficiency of the thresher mechanism.

In accomplishing these and other objects of the invention, I have provided improved details of structure, the preferred form of which is illustrated in the accompanying drawings, wherein:

Fig. 1 is a perspective view of a combine harvesting machine, the reel being removed for more clearly illustrating the thresher mechanism constructed and arranged on the machine in accordance with my invention.

Fig. 2 is a side view of the machine partly broken away for illustrating the relation of the thresher and separator mechanism.

Fig. 3 is a central, longitudinal section through the harvester and thresher units illustrating the relation of the harvester conveyor with the thresher mechanism.

Fig. 4 is a plan view of the machine illustrating the transmission mechanism operably connecting the thresher and reaper units with the separator unit.

Fig. 5 is a transverse section through the thresher unit on the line 5—5, of Fig. 3.

Fig. 6 is a side elevation of the machine particularly illustrating the driving mechanism connecting the operative elements of the separator unit.

Referring in detail to the drawings:

1 designates the comibne as a whole, including a main frame 2 supported on wheels 3, 4, and 5 and carrying a grain bin 6, an operator's platform 7, and a motor 8 for driving the reaper, thresher and separator units 9, 10 and 11 as the machine is drawn through a field by a tractor or other suitable draft means.

Extending laterally from the main frame 2 is a sill member 13 supporting a framework 14 comprising spaced vertical posts 15 connected with the grain bin structure by a cross rail 16 and braced from the structure and from the main frame by brace members 17 and 18. The outer end of the framework is supported on the grain wheel 3, and located between the spaced posts 15 is the separator housing 19 extending longitudinally on the main frame and carrying a drive shaft 20 operably connected with the motor 8 by a chain belt 21 and adapted for driving the operative elements of the reaper, thresher and separator units as later described.

Pivotally supported from the drive shaft 20 by arms 22 on opposite sides of the housing 19 and by an arm 23 on the end post 15 is a sub-frame 24 extending laterally from the front end of the separator housing for carrying the reaper and thresher units 9 and 10.

The sub-frame 24 includes longitudinally extending channel members 25 and 26 carrying a platform 27, and mounted on the upper flange of the channel member 25 along the front longitudinal edge of the platform is a cutter bar 28 cooperating with a sickle 29 reciprocable thereon for cutting the grain in accordance with common practice.

The platform 27 is provided with a back board 30 and located at opposite ends of the sub-frame 24 are brackets 31 and 32 supporting a reel 33 for urging the grain into the sickle 29.

The sub-frame 24 is adjustable on its pivotal mounting by tilting mechanism 34 including a ratchet wheel 35 having a crank arm 36 connected with the sub-frame by a connecting rod 37, and an operating lever 38 whereby the frame may be raised or lowered for cutting the grain at the proper height.

Mounted in suitable bearings at opposite ends of the platform 27 are transverse shafts 39 and 40 (Fig. 3) carrying a belt conveyor 41 for delivering cut grain from the cutter bar to the thresher unit 10 presently described.

Located on the sub-frame 24 and communicating with the forward end of the housing 19 is a thresher housing 42 including side walls 43 and 44 and a top wall 45 forming a chamber 46 in longitudinal alignment with the platform 27, and having an open end 47 for receiving the inner end of the belt conveyor 41.

The housing 42 includes a rearward extension 48 (Fig. 2) extending into the separator housing and having an outlet opening 49. Located in the housing chamber 46 is a thresher cylinder 50 fixed on a shaft 51 journaled in bearings 52 on the side walls 43 and 44 and protruding rearwardly from the wall 44 for the mounting of a sprocket 53 and a universal coupling member 54.

Spaced outwardly from the thresher cylinder 50 adjacent the open end 47 of the thresher housing is a feeder 55 supported on a shaft 56 rotatable in bearings 57 on the side walls 43 and 44, and fitted with a sprocket 58 operably connected with the sprocket 53 by a chain belt 59 whereby the feeder is actuated for feeding cut grain from the conveyor belt 41 to the thresher cylinder.

Provided in the housing 42 below the cylinder 50 is a concave 60 cooperating with rasp bars 61 on the cylinder 50 for threshing the grain as it is delivered thereto by the feeder 55. Located in the thresher housing 42 is a transverse conveyor 62 including an endless belt 63 carried on sprockets 64 fixed on spaced shafts 65 and 66, and mounted on the front side wall 43 within the thresher housing is a baffle plate 67 (Fig. 2) for directing threshed grain onto the transverse conveyor for delivery to an inclined carrier belt 68 in the housing extension 48.

The carrier belt 68 is supported on shafts 69 and 70, and located above the carrier belt is a beater 71 for agitating the grain passing over the carrier 68 to an inclined conveyor 72 in the separator housing for delivery of the grain to the separating and cleaning mechanism.

Fixed on the drive shaft 20 is a bevel gear member 73 enclosed in a housing 74 pivotally supported on the shaft, and meshing with a cooperating gear member 75 fixed on a connector shaft 76. The shaft 76 extends transversely of the drive shaft and is journaled in bearings 77 and 78, its forward end being provided with a yoke 79 for connection with the universal coupling member 54 on the cylinder shaft 48 so that the sub-frame carrying the reaper and thresher mechanism may be raised or lowered by the tilting mechanism 34 for cutting the grain at the desired height without affecting the operation of the thresher mechanism.

In using a combine machine having the thresher mechanism constructed and arranged as herein illustrated and described, the machine is drawn through a field of grain by a tractor or other suitable draft means and the operative elements of the reaper, thresher and separator units driven from the independent motor carried by the machine.

The bevel gear member 73 on the drive shaft 20 meshing with the bevel gear 75 on the connector shaft 76 causes clockwise rotation of the thresher cylinder 50, and the chain belt 59 connecting the sprocket 53 on the cylinder shaft 51 with the sprocket 58 on the beater shaft 56 causes clockwise rotation of the feeder 55, so that cut grain delivered to the feeder by the conveyor 41 is fed directly from the conveyor into the cylinder in a steady uniform flow without change of direction for permitting thorough threshing of the grain without clogging, and permitting the machine to function smoothly and evenly, consequently minimizing wear on the parts and reducing the cost of operation.

What I claim and desire to secure by Letters Patent is:

1. In a harvesting machine of the character describde including a main frame, a sub-frame adjustably supported by the main frame, a separator unit on the main frame including a forwardly opening housing, a thresher housing supported by the sub-frame having a transversely extending portion, and a longitudinally extending portion pivoted in said forwardly opening housing, a threshing cylinder rotatably mounted transversely of the transverse portion of the thresher housing, and a conveyor operable in the longitudinally extending portion of the thresher housing for moving grain discharged from the threshing cylinder into the forwardly opening housing of the separator unit.

2. In a harvesting machine, a main frame, a sub-frame pivotally supported on the main frame, a separator unit on the main frame including a forwardly opening housing, a thresher housing supported on the sub-frame having a transversely extending portion and a longitudinally extending portion pivoted in the forwardly opening housing in line with the pivot mounting of the sub-frame, a threshing cylinder extending transversely of the transverse portion of the thresher housing, means in said thresher housing for changing direction of travel of material discharged from the threshing cylinder, and a conveyor in said longitudinally extending portion of the thresher housing for moving the grain to the forwardly opening housing of the separator unit.

3. In a harvesting machine of the character described, a main frame, a sub-frame pivotally supported on the main frame, a separator unit on the main frame including a forwardly opening housing, a thresher housing supported by the sub-frame having a transverse portion and a longitudinally extending portion pivoted in said forwardly opening housing in line with the pivotal mounting of the sub-frame, a threshing cylinder operable in the transverse portion of a thresher housing, a conveyor extending parallel with the threshing cylinder for changing direction of travel of grain discharged from the threshing cylinder, and a conveyor in the longitudinally extending portion of the thresher housing for moving grain from the first named conveyor to the separator unit.

4. In a harvesting machine of the character described comprising a main frame, a sub-frame pivotally supported on the main frame, a separator unit on the main frame including a forwardly opening housing, a thresher housing supported by the sub-frame having a transversely extending portion and an upwardly inclined longitudinally extending portion pivoted in said forwardly opening housing in line with the pivotal mounting of the sub-frame, a threshing cylinder extending transversely of the transverse portion of the thresher housing, a conveyor extending parallel with the threshing cylinder for changing direction of travel of grain discharged from the threshing cylinder, an inclined conveyor for receiving grain from the first named conveyor and discharging it into the forwardly opening housing of the separator unit, and a beater for agitating grain moved by the last named conveyor.

In testimony whereof I affix my signature.

STEPHEN H. HALE.